Patented Nov. 17, 1925.

1,562,295

UNITED STATES PATENT OFFICE.

KENNETH F. COOPER, OF GREAT NECK, NEW YORK, ASSIGNOR TO AMERICAN CYANAMID COMPANY, OF NEW YORK, N. Y., A CORPORATION OF MAINE.

PROCESS OF PRODUCING CYANIDE SOLUTIONS.

No Drawing.  Application filed February 21, 1923. Serial No. 620,503.

*To all whom it may concern:*

Be it known that I, KENNETH F. COOPER, a citizen of the United States, residing at Great Neck, in the county of Nassau and State of New York, have invented certain new and useful Improvements in Processes of Producing Cyanide Solutions; and I do hereby declare the following to be a full, clear, and exact description of the invention, such as will enable others skilled in the art to which it appertains to make and use the same.

This invention relates to process of producing cyanide solutions, and has for its object to provide a procedure which will be more efficient in the extraction of precious metals than those which have been heretofore proposed.

With these and other objects in view the invention consists in the novel steps and combinations of steps constituting the process, all as will be more fully hereinafter disclosed and particularly pointed out in the claims.

In order that the precise invention may be the more clearly understood it is said:—A crude cyanide compound prepared by fusion of crude calcium cyanamid and common salt is described and claimed in U. S. Patent #1,359,257, Nov. 16, 1920, to W. S. Landis, and it is now extensively used in the mining industry for the extraction of gold and silver from their ores. This crude cyanide compound in its solid condition consists essentially of calcium cyanide and sodium chloride, together with calcium oxide and graphite, and it also contains small amounts of calcium carbide, calcium sulphide and calcium cyanamid. But, when this solid crude cyanide compound is added directly to mill solutions containing gold and silver, certain difficulties are often encountered not only due to the acetylene produced by the reaction between the calcium carbide present and the water of the solution, which acetylene is an active deoxidizing agent, but difficulties are also encountered from the presence of soluble sulphides which under certain conditions act as precipitants of the precious metals.

According to this invention on the other hand, I have found that if the said solid crude cyanide be first dissolved in water, or in a barren mill solution, before introducing it into the solutions of the mill circuit, all carbide compounds are destroyed through their reaction with the water present and the troubles previously encountered from the deoxidizing action of the acetylene heretofore generated are entirely eliminated. But, while this presolution of the crude cyanide is effective in the elimination of the acetylene, it is not effective in destroying the sulphides present in the original cyanide.

I have found, however, that if the water solution of the crude cyanide be agitated in such a manner that it comes in contact with the air or oxygen, these sulphide compounds are gradually destroyed with the formation of thiocyanate compounds which have no precipitating action upon the precious metals later to be dissolved. This destruction of the sulphide compounds in the original cyanide is more rapid when a very intimate contact between the air and the solution under treatment is provided, as for example, by vigorous agitation of the solution being purified with a propeller agitator, by circulation of the solution with an air lift pump, or by introduction of air into the said solution in a finely divided condition through some porous medium. After the sulphide compounds have been destroyed in this way the purified cyanide solution may now be added to mill solutions containing precious metals without causing any precipitation of the values present. The following test will illustrate the effectiveness of the above procedure. I dissolved 75 pounds of the above mentioned crude patented cyanide in 1875 pounds of water and agitated the mixture for four hours with an air lift pump to purify the same of its sulphide constituents. At the start of the test and at intervals thereafter I withdrew partially purified samples from the mixture and continued the aeration and mixing until I found that all sulphide sulphur compounds had been destroyed. The partially purified samples of solution withdrawn at the start and during the continuance of the test I added to a pregnant mill solution in the proportion of 20 cubic centimeters of the cyanide solution to 10 assay tons of the mill solution. This mill solution contained $0.53 silver and $3.48 gold or a total of $4.01 per ton of solution. After mixing the cyanide and mill solutions I filtered them and assayed the insoluble portion for precipitated precious metals.

The results of the test are as follows:—

| Time of mixing and aeration of cyanide solution | Values precipitated by 20 c. c. of cyanide solution. | | |
|---|---|---|---|
| | $ Ag. | $ Au. | $ Total. |
| 1 hour | .295 | .020 | .315 |
| 2 hours | .200 | Trace. | .200 |
| 3 hours | .070 | None. | .070 |
| 4 hours | None. | None. | None. |

In other words, it will be seen that after the cyanide solution had been aerated for one hour it still had present therein enough sulphide sulphur to precipitate $0.295 of silver and $0.020 of gold. At the end of two hours of aeration the precipitated silver had been reduced to $0.200 and the gold to a trace. After 3 hours of treatment the precipitated silver was only $0.070 and the gold was nothing. At the end of four hours neither gold nor silver was being precipitated.

While this method for the removal of sulphides is effective it is somewhat slow, and I continued experiments to find means of shortening the time required. I am aware that it is a common practice to remove sulphide sulphur by adding to the solution containing it an oxidizing agent, such as for example potassium permanganate, lead peroxide or bromine, or to remove the sulphur by precipitating it as a sulphide of a heavy metal by the addition of a soluble heavy metal salt. But these procedures have the disadvantage that they require the use of an amount of the reagent sufficient to completely oxidize or to completely precipitate the sulphur and they therefore, constitute exceedingly expensive operations.

After many experiments I have found that when the agitation of the crude cyanide solutions in contact with air is conducted in the presence of a small amount of a heavy metal compound, for example, lead oxide or a solution of lead acetate, the time required for the complete removal of the sulphur by the air is much less than that required when the heavy metal compound is not used. It was further found that the time required for a complete sulphide removal is reduced by increasing the quantity of the heavy metal compound used, but in no case when air is used, is it necessary to employ an amount of the heavy metal compound which is chemically equivalent to the sulphide sulphur. By the use, therefore, of agitation in presence of air and of a heavy metal compound, I am enabled to completely remove sulphur in a very short time and at a relatively small cost.

I am led to believe that the heavy metal compound acts as a catalytic agent in assisting in the reaction between atmospheric oxygen and sulphide sulphur from the following experiment. I prepared a solution of the crude patented cyanide and filtered it to remove suspended matter. To this solution I added an amount of litharge chemically equivalent to only one tenth of the sulphide sulphur known to be present. As soon as the litharge was added to the cyanide solution it turned black due to the formation of lead sulphide. I now aerated the solution vigorously by violent stirring and found that after thirty minutes the litharge was restored to its original color. I now filtered out the lead compound and analyzed the resulting solution, finding it to be entirely free from sulphide but containing an amount of thiocyanate sulphur equal to that which had originally been present as sulphide sulphur.

The lead compound which I had filtered off I added to a fresh portion of crude cyanide solution and repeated the experiment, finding that the lead was as effective now as it had been when first used. So far as I know I might have continued the use of this portion of lead indefinitely.

In one experiment I found that an aeration of the crude cyanide solution without the use of a lead compound only slightly reduced the sulphide sulphur in one hour. When I added litharge in an amount equivalent to 10% of the sulphur and agitated in air I completely removed the sulphide sulphur in thirty minutes. When I used oxygen in presence of the lead compound the action was still more rapid, while aeration in nitrogen failed to remove sulphur even in the presence of lead.

All these experiments convince me that the lead salt acts as a true catalyst in accelerating the reaction between the sulphide sulphur and the oxygen of the air.

I have found that the salts of lead are most active in this respect although salts of manganese, mercury, zinc and copper possess the property to a less degree.

As a practical example of the working of a lead salt as an accelerating agent, in removing sulphide sulphur from crude cyanide solutions, I performed the following experiment. I dissolved 75 pounds of the crude patented cyanide compound in 1875 pounds of water and added 0.38 pounds of lead acetate. This amount of lead acetate is chemically equivalent to $\frac{1}{10}$ of the sulphide sulphur present. I now agitated the mixture with an air lift pump exactly as in the first test previously described, removing samples at the start and at intervals thereafter. 20 c. c. portions of these samples were added to 10 assay ton portions of the mill solution and the precipitated values assayed as already described.

The following results were obtained:

| Time of mixing and aerating crude cyanide solution. | Values precipitated by 20 c. c. of cyanide solution. | | |
|---|---|---|---|
| | $ Ag. | $ Au. | $ Total. |
| 15 minutes | .118 | None. | .118 |
| 30 minutes | .058 | None. | .058 |
| 45 minutes | .020 | None. | .020 |
| 60 minutes | None. | None. | None. |

By comparing the results of this test with those of the first test it will be seen that the solutions of the crude cyanide compound are rendered incapable of precipitating precious metals in a very much shorter time when the aeration is conducted in the presence of the lead salt, or catalyst.

After removing the sulphide sulphur by mixing in the crude cyanide solution a heavy metal salt or catalyst and aerating the same, one may then add the purified cyanide solution thus obtained to a pregnant mill solution containing precious metals, or to the ore to be treated, and may proceed in the usual way with the extraction of the precious values present.

In other words, it will now be clear if one takes the crude cyanide above mentioned and heretofore employed, and which contains small percentages of calcium carbide and sulphide sulphur, makes a preliminary water solution thereof, and aerates the solution for three or four hours, the aerated solution will contain all its sulphide sulphur in the form of thiocyanate compounds, which do not precipitate precious metals. On the other hand, this time of aeration may be very greatly shortened and the crude solution just as effectively freed of its content of calcium carbide, and sulphide sulphur, if one adds to said crude solution a relatively small quantity of a heavy metal catalyst, such for example as a salt of lead, manganese, mercury, zinc, or copper. These heavy metal salts may be added in quantities very much less than would be required to chemically react with all the sulphide sulphur present. In either procedure, one obtains a crude cyanide solution containing calcium cyanide, sodium chloride, calcium hydrate, some insoluble graphite, and sulphur in a thiocyanate form. That is, the crude solution has been purified of its sulphide sulphur, and of its calcium carbide, and therefore will not now precipitate the precious metals.

It will be evident that those skilled in the art may vary the details of the process without departing from the spirit of the invention, and I therefore do not wish to be limited to the above disclosure except as may be required by the claims.

What I claim is:

1. The process of preparing a solution suitable for extracting precious metals from their ores, which consists in dissolving in water a crude cyanide compound containing calcium carbide, and sulphide sulphur, to get rid of said carbid; and aerating the solution thus obtained with a gas containing oxygen to change said sulphide sulphur into the thiocyanate form.

2. The process of preparing a solution suitable for extracting precious metals from their ores, which consists in dissolving in water a crude cyanide compound containing calcium carbide and sulphide sulphur, to get rid of said carbide; adding to said solution a salt of a heavy metal; and aerating the solution thus obtained with a gas containing oxygen in the presence of said salt to change said sulphide sulphur into the thiocyanate form.

3. The process of preparing a solution suitable for extracting precious metals from their ores which consists in dissolving in water a crude cyanide compound containing calcium carbide and sulphide sulphur, to get rid of said carbide; adding to said solution a catalyst adapted to accelerate the change of said sulphide sulphur into the thiocyanate form; and aerating the solution thus obtained with a gas containing oxygen to change said sulphide sulphur into the thiocyanate form.

4. The process of preparing a solution suitable for extracting precious metals from their ores which comprises dissolving in water a cyanide containing sulphide sulphur and causing an oxidizing reaction between said sulphur and a portion of said cyanide to form a thiocyanate.

5. The process of preparing a solution suitable for extracting precious metals from their ores which comprises dissolving in water a cyanide containing sulphide sulphur and causing a reaction between said sulphur and a portion of said cyanide in the presence of oxygen to form a thiocyanate.

6. The process of preparing a solution suitable for extracting precious metals from their ores which comprises dissolving in water a cyanide containing sulphide sulphur and causing a reaction therebetween in the presence of oxygen and a catalyst to form a thiocyanate.

7. The process of extracting precious metals from their ores which consists in dissolving in water a crude cyanide compound containing sulphide sulphur; treating the solution thus obtained with a gas containing oxygen to convert at least a portion of the sulphur present into the form of a thiocyanate; and applying the solution thus obtained to the ore to be treated.

8. The process of extracting precious metals from their ores consisting in dissolving a crude cyanide compound derived from crude calcium cyanamid; treating said solution with air; and reacting on the ore to be treated with the solution thus obtained.

9. The process of extracting precious metals from their ores consisting in dissolving a crude cyanide compound prepared from crude calcium cyanamid; adding to the solution a heavy metal compound; mixing the solution in contact with air; and reacting on the ore to be treated, substantially as described.

10. The process of extracting precious metals from their ores consisting in dissolving a crude cyanide compound prepared from crude calcium cyanamid; adding to the solution a lead compound; mixing the solution in contact with air; and reacting on the ore to be treated, substantially as described.

11. The process of extracting precious metals from their ores consisting in dissolving a crude cyanide compound prepared from crude calcium cyanamid; adding to the solution an amount of a heavy metal compound less than the chemical equivalent of the sulphur; mixing the solution in contact with air; and reacting on the ore to be treated, substantially as described.

12. The process of extracting precious metals from their ores consisting in dissolving a crude cyanide compound prepared from crude calcium cyanamid and containing combined sulphur; adding to the solution an amount of a lead compound less than the chemical equivalent of the sulphur present; mixing the solution in contact with air; and reacting on the ore to be treated with the solution thus obtained, substantially as described.

In testimony whereof I affix my signature.

KENNETH F. COOPER.